United States Patent
Redtenbacher et al.

(10) Patent No.: US 8,720,411 B2
(45) Date of Patent: May 13, 2014

(54) RECIPROCATING PISTON ENGINE

(71) Applicant: GE Jenbacher GmbH & Co OG, Jenbach (AT)

(72) Inventors: Christoph Redtenbacher, Graz (AT); Eduard Schnessl, Altenmarkt (AT); Hubert Winter, Graz (AT); Andreas Wimmer, Graz (AT); Martin Klinkner, Wiesing (AT)

(73) Assignee: GE Jenbacher GmbH & Co. OG, Jenbach (AT)

( * ) Notice: Subject to any disclaimer, the term of this patent is extended or adjusted under 35 U.S.C. 154(b) by 0 days.

(21) Appl. No.: 13/875,450

(22) Filed: May 2, 2013

(65) Prior Publication Data

US 2013/0233273 A1   Sep. 12, 2013

Related U.S. Application Data

(63) Continuation of application No. PCT/AT2011/000386, filed on Sep. 21, 2011.

(30) Foreign Application Priority Data

Nov. 2, 2010  (AT) ................ A 1803/2010

(51) Int. Cl.
  *F02B 19/18*  (2006.01)
  *F02B 19/08*  (2006.01)
(52) U.S. Cl.
  USPC .......................... 123/286; 123/261
(58) Field of Classification Search
  USPC ......... 123/253, 259, 260, 261, 262, 263, 267, 123/268, 275, 286, 289, 290, 291, 293
  See application file for complete search history.

(56) References Cited

U.S. PATENT DOCUMENTS

| | | | | |
|---|---|---|---|---|
| 2,741,229 A | * | 4/1956 | Stump | 123/261 |
| 4,232,638 A | | 11/1980 | Takahashi et al. | |
| 4,294,209 A | * | 10/1981 | Eisele et al. | 123/293 |
| 6,055,955 A | * | 5/2000 | Benedikt et al. | 123/259 |
| 2007/0051338 A1 | * | 3/2007 | Merritt | 123/253 |

FOREIGN PATENT DOCUMENTS

| | | |
|---|---|---|
| JP | 6-30433 | 4/1994 |
| JP | 2008-169706 | 7/2006 |
| WO | 2009/109694 | 9/2009 |

OTHER PUBLICATIONS

International Search Report (ISR) issued Jan. 12, 2012 in International (PCT) Application No. PCT/AT2011/000386.

* cited by examiner

*Primary Examiner* — Mahmoud Gimie
(74) *Attorney, Agent, or Firm* — Wenderoth, Lind & Ponack, L.L.P.

(57) ABSTRACT

The invention relates to a reciprocating piston engine, comprising at least one main combustion chamber, which is formed between a piston and a cylinder and which is connected by means of a riser to a pre-chamber having a pre-chamber axis, so that gas-air mixture pushed from the main combustion chamber into the riser by the piston forms a rising flow in the pre-chamber, wherein a gas supply channel separate from the riser opens into the prechamber, and wherein the riser and the gas supply channel are oriented with respect to each other in such a way that gas fed into the pre-chamber by means of the gas supply channel hits the rising flow substantially head-on, wherein the riser runs at an angle from the pre-chamber axis.

8 Claims, 3 Drawing Sheets

RECIPROCATING PISTON ENGINE

The present invention concerns a reciprocating piston engine comprising a main combustion chamber which is formed between a piston and a cylinder and which is in communication by way of a riser passage to a pre-chamber having a pre-chamber axis so that gas-air mixture pushed by the piston from the main combustion chamber into the riser passage forms a rising flow in the pre-chamber, wherein a gas feed passage separate from the riser passage opens into the pre-chamber and wherein the riser passage and the gas feed passage are so oriented relative to each other that gas fed into the pre-chamber by way of the gas feed passage impinges substantially frontally on to the rising flow. The invention further concerns a method of operating such a reciprocating piston engine.

Reciprocating piston engines with bore diameters of the cylinders as from about 200 mm are frequently operated in the form of pre-chamber engines. The purpose of the pre-chamber is to increase the ignition energy of the spark plug to permit ignition of the lean mixture in the main combustion chamber.

If the pre-chamber is operated in gas-scavenged fashion by a gas feed passage separate from the riser passage (to increase the energy content of the chamber), enrichment of the chamber with fuel gas is usually effected in the charge exchange by way of a pressure-controlled gas valve connected to the gas feed passage.

In the compression cycle lean gas-air mixture flows out of the main combustion chamber into the pre-chamber and is mixed with the enriched mixture found therein. Up till the ignition time the mixture in the pre-chamber can be extensively homogenized, but locally inadequately mixed zones remain. Due to locally rich and lean zones combustion takes place incompletely and more slowly whereby less ignition pulse is available for ignition of the main combustion chamber. The level of efficiency is also worsened. In addition a very rich zone remains in the gas feed passage so that the formation of soot particles occurs here during combustion. In the charge exchange phase those particles pass by way of the pre-chamber into the main combustion chamber and further by way of the outlet passages into the exhaust system. The consequence of this is that problems occur due to fouling of the subsequent system components and soot particles pass into the environment without suitable exhaust gas post-treatment.

A reciprocating piston engine having the features of the classifying portion of a first aspect of the invention is disclosed in JP 6-30433 U. That specification provides an off-center arrangement of a riser passage, the axes of the riser passage and a gas feed passage being substantially aligned.

JP 2008169706 A discloses a reciprocating piston engine with a centrally arranged riser passage and a gas feed passage having an inclinedly extending axis. The axis of the gas feed passage and the axis of the riser passage are not arranged in alignment.

The object of the invention is to provide a reciprocating piston engine of the general kind set forth, in which the above-mentioned problems are at least partially overcome.

That is attained by a reciprocating piston engine according to the first aspect of the invention and a method according to a second aspect of the invention.

The invention affords an improvement in homogenization of the mixture in the pre-chamber with the better performance linked thereto (faster burning of the mixture, better spark ignition in the main combustion chamber) and a reduction in soot formation due to rich zones in the gas feed passage.

Scavenging of the pre-chamber by way of the gas feed passage takes place in the compression cycle. The arrangement of riser passage, pre-chamber and gas feed passage is to be of such a configuration that in the most advantageous case the axes of the riser passage and the gas feed passage are aligned or however assume at maximum a slight angle relative to each other. In no case however should the angle be so great that the axis of the gas feed passage passes through the cylinder wall of the riser passage at the level of the mouth opening of the riser passage into the pre-chamber. At the same time the design of the pre-chamber must be such that it does not affect the free volume between the riser passage and the gas feed passage due to undercut configurations or other shaping. The aim of that arrangement is to already achieve good pre-mixing of the gas introduced by way of the gas feed passage with the mixture flowing from the main combustion chamber into the pre-chamber, during the injection process. The mixture formation effect is increased by the two flows being incident in as frontal relationship as possible, as can be confirmed both by means of CFD simulations and also by means of optical investigations in an injection chamber.

In addition sufficient gas pressure should be available for the injection process so that, in spite of the rising compression pressure in the compression phase, an adequate depth of penetration of the injection jet issuing from the gas feed passage is achieved, which has a positive effect on pre-mixing.

The arrangement of the passages also gives the advantage that, after the conclusion of the injection process, lean mixture flows in the direction of the gas feed passage, which causes dilution of the rich zone in the gas feed passage. As investigations on a test bench have shown the occurrence of soot in the gas feed passage can thus be significantly reduced.

Particularly preferably a further improvement in mixture formation is provided by the generation of a tumble flow in the pre-chamber. In that case the riser passage of the pre-chamber is to be positioned asymmetrically or off-center in such a way that the lean mixture flowing into the pre-chamber from the main combustion chamber there produces a defined tumble flow. That tumble flow permits wide-ranging involvement of the pre-chamber so that the enriched mixture which has already been pre-mixed by counteracting flows can be further homogenized. Asymmetry is afforded while observing the above-described geometrical conditions by the inclination of the riser passage relative to the pre-chamber axis. Whether a tumble flow is produced with a given geometry can be easily established by numerical simulation or by using test engines.

The fact was mentioned that the rising flow is formed by a gas-air mixture and is incident on gas supplied by way of the gas feed passage. That is not intended to give the impression as though the gas supplied by way of the gas feed passage may only be a pure gas in the sense that the gas only consists of fuel gas with air mixed therewith. If precise language is to be used then both the gas forming the rising flow and also the gas supplied by way of the gas feed passage should each be referred to as a fuel gas-air mixture, in which case the gas forming the rising flow will always have a relevant admixing of air while it can certainly be envisaged that the gas supplied by way of the gas feed passage is actually substantially pure gas without mixed air therewith. For reasons of greater ease of readability this specification dispensed with use of the exact terminology, which however is not to be interpreted as a limitation on the scope of protection.

BRIEF DESCRIPTION OF THE DRAWINGS

The reciprocating piston engine according to the invention is particularly preferably in the form of a stationary gas engine.

Further advantages and details of the invention will be apparent from the Figures and the related specific description. In the Figures.

BRIEF DESCRIPTION OF THE INVENTION

Figure 1:
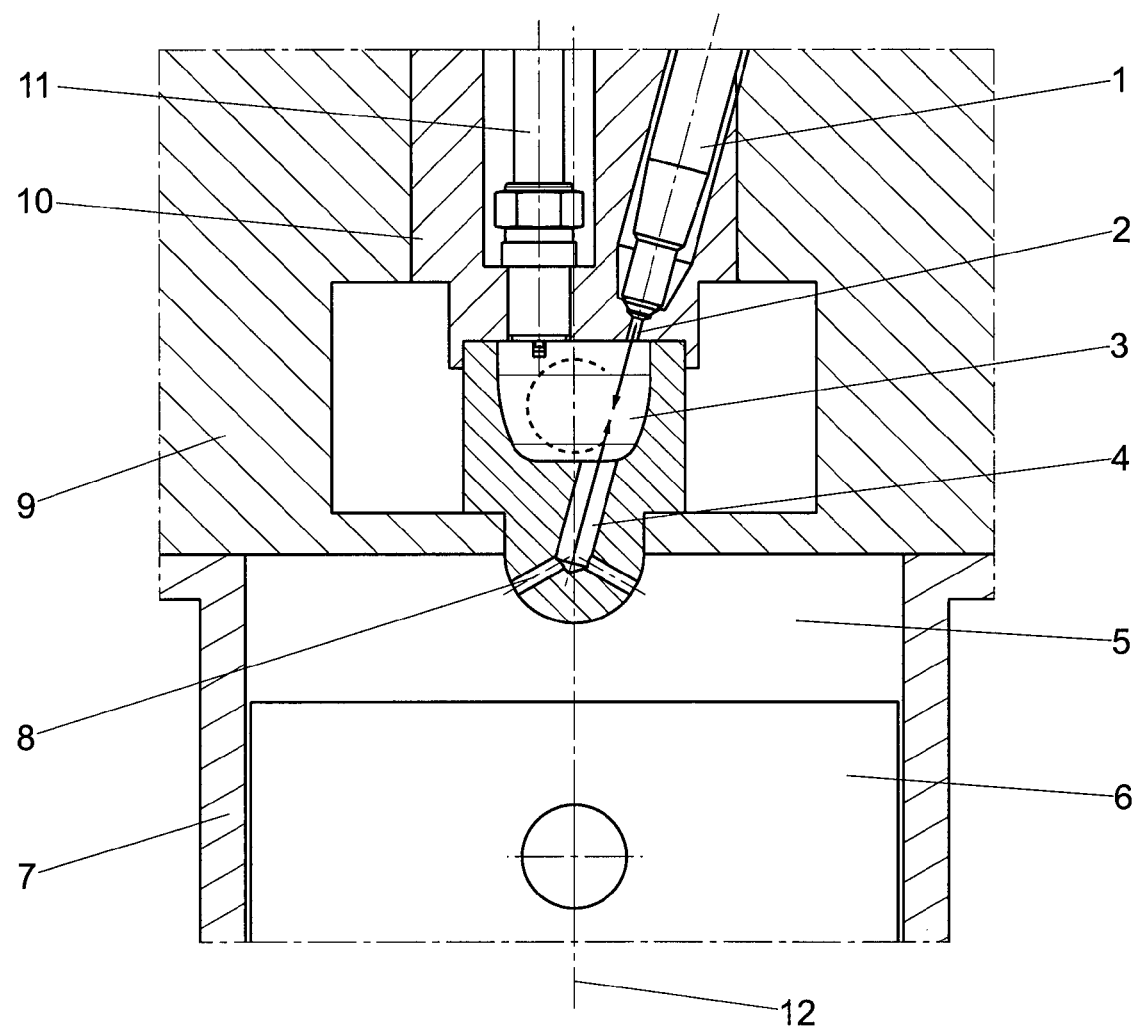
FIG. 1 shows a sectional view of the part of a reciprocating piston engine, that is relevant to the invention.

FIG. 1 relates to the preferred embodiment of the invention in which not only are the riser passage 4 and the gas feed passage 2 so oriented relative to each other that gas fed into the pre-chamber 3 by way of the gas feed passage 2 impinges substantially frontally on the rising flow issuing from the riser passage 4 (solid arrows in FIG. 1), but it is additionally provided that the riser passage 4 opens in an off-center position into the pre-chamber 3 in such a way that this produces a defined tumble flow (broken-line arrow in FIG. 1).

According to the invention in the method of operating the reciprocating piston engine it is provided that, in that phase in which mixture is urged by the piston 6 out of the main combustion chamber 5 by way of the flow transfer bores 8 and the riser passage 4 (compression cycle) gas is passed into the pre-chamber 3 by way of the gas feed passage 2. That is effected by way of the gas valve 1 which is preferably in the form of an electrically actuable gas injector.

Figure 2A:
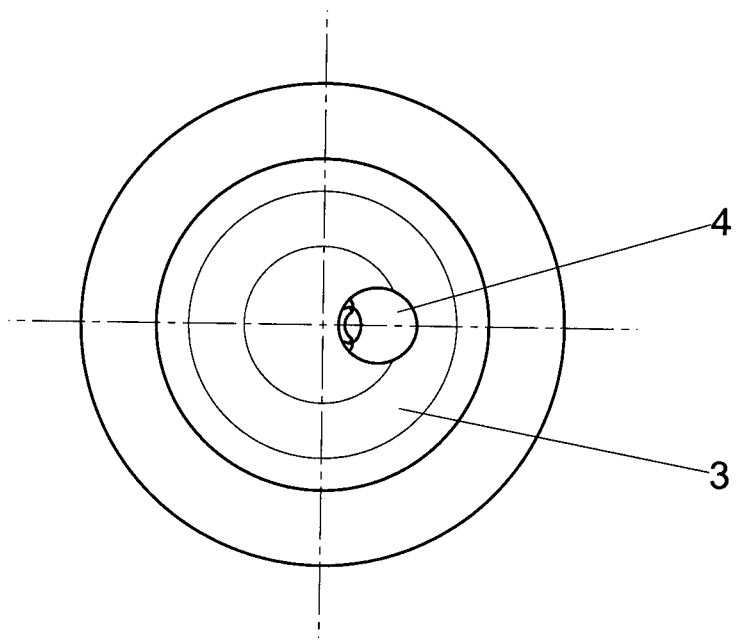
FIGS. 2a and 2b show a plan view and a perspective view of a pre-chamber used with the invention outside its position of installation in the reciprocating piston engine.
Figure 2B:
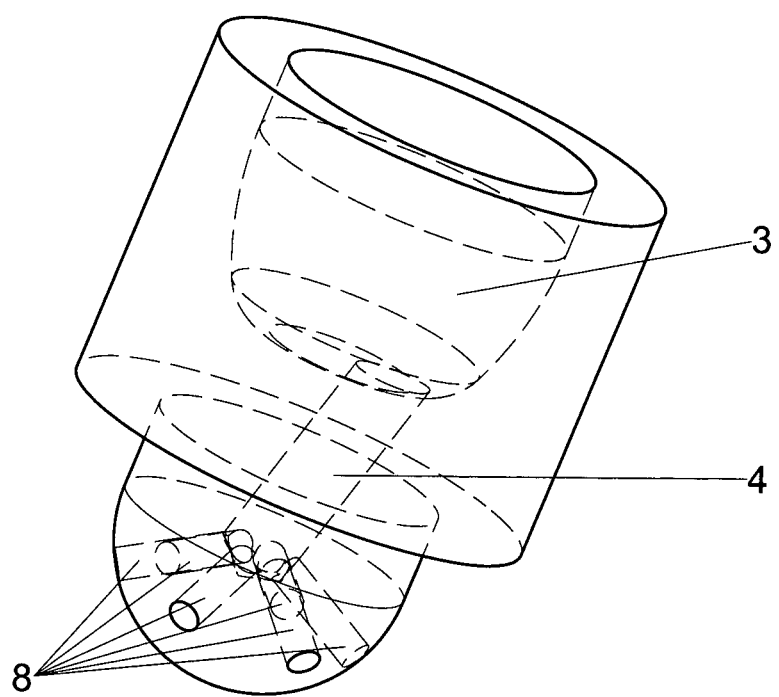

FIG. 2a shows the preferably provided off-center mouth opening of the riser passage 4 into the pre-chamber 3. FIG. 2b shows a corresponding perspective view, wherein it is possible to see six flow transfer bores 8 which connect the main combustion chamber 5 (not shown) to the riser passage 4.

Figure 3:
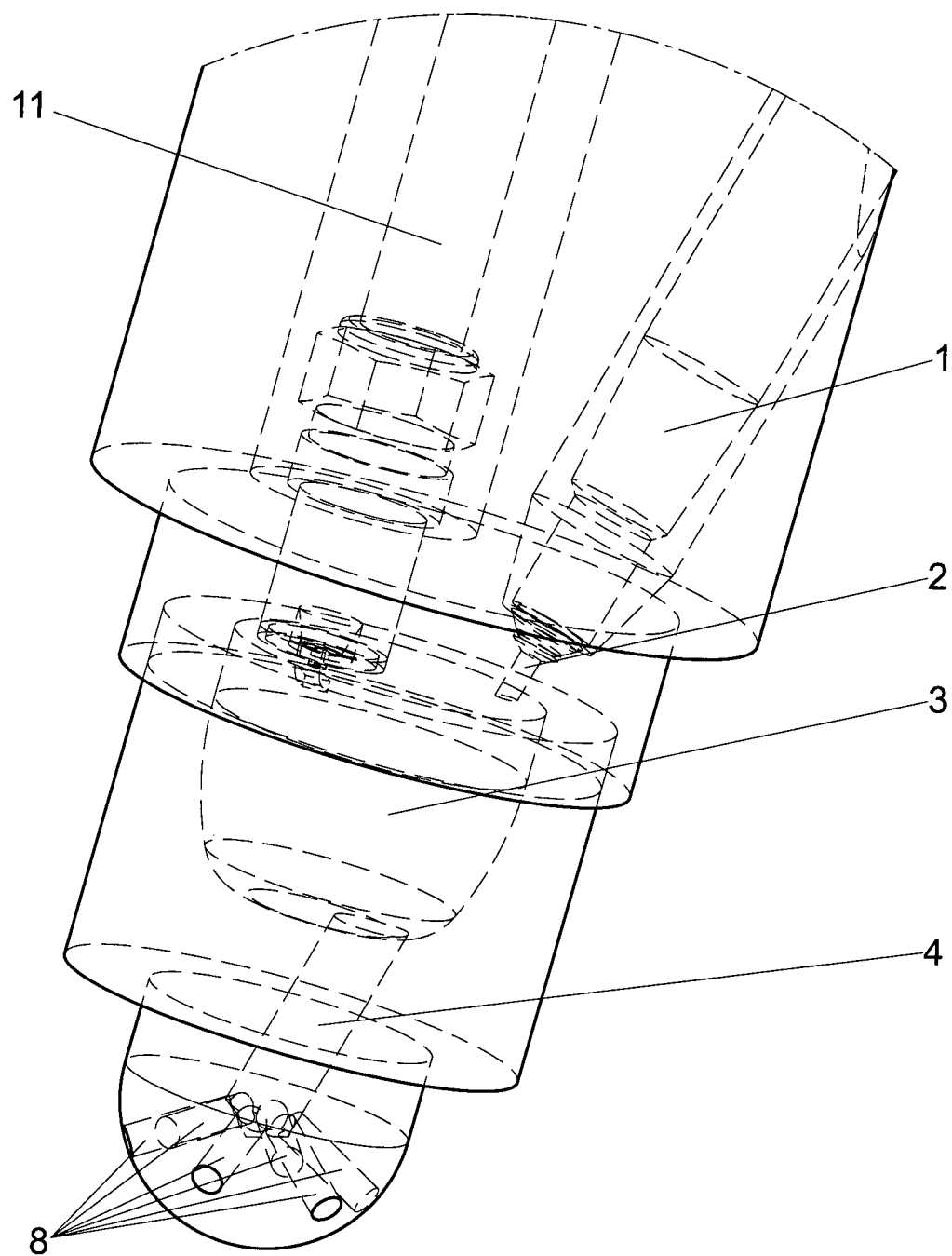
FIG. 3 shows a perspective view of the pre-chamber showing an ignition device and the gas valve.

FIG. 3 shows a perspective view in relation to the relevant parts of FIG. 1.

1 gas valve
2 gas feed passage
3 pre-chamber
4 riser passage
5 main combustion chamber
6 piston
7 cylinder sleeve
8 flow transfer bores
9 cylinder head
10 spark plug sleeve
11 spark plug
12 pre-chamber axis

The invention claimed is:

1. A reciprocating piston engine comprising:
a piston;
a cylinder;
a main combustion chamber which is formed between the piston and the cylinder;
a pre-chamber having a pre-chamber axis;
a riser passage arranged such that the main combustion chamber is in communication by way of the riser passage with the pre-chamber so that a gas-air mixture pushed by the piston from the main combustion chamber into the riser passage forms a rising flow in the pre-chamber; and
a gas feed passage separate from the riser passage which opens into the pre-chamber, wherein the riser passage and the gas feed passage are oriented relative to each other such that gas fed into the pre-chamber by way of the gas feed passage impinges substantially frontally on to the rising flow, wherein the riser passage extends inclinedly relative to the pre-chamber axis, and wherein the riser passage is arranged such that the gas-air mixture forms a tumble flow in the pre-chamber.

2. A reciprocating piston engine as set forth in claim 1, wherein the riser passage opens off-center into the pre-chamber.

3. A reciprocating piston engine as set forth in claim 1, wherein the gas feed passage is connected to a gas valve.

4. A reciprocating piston engine as set forth in claim 3, wherein the gas valve is an electrically actuable gas injector.

5. A method of operating a reciprocating piston engine which includes
a piston,
a cylinder,
a main combustion chamber which is formed between the piston and the cylinder,
a pre-chamber having a pre-chamber axis,
a riser passage arranged such that the main combustion chamber is in communication by way of the riser passage with the pre-chamber, the riser passage extending inclinedly relative to the pre-chamber axis, and
a gas feed passage separate from the riser passage which opens into the pre-chamber, said method comprising:
pushing a gas-air mixture by the piston from the main combustion chamber into the riser passage so as to form a rising, tumble flow in the pre-chamber; and
feeding gas into the pre-chamber by way of the gas feed passage so as to impinge substantially frontally on to the rising flow, wherein said pushing of the gas-air mixture and said feeding of the gas are performed in a same phase.

6. A reciprocating piston engine as set forth in claim 2, wherein the gas feed passage is connected to a gas valve.

7. A reciprocating piston engine as set forth in claim 6, wherein the gas valve is an electrically actuable gas injector.

8. A method of operating a reciprocating piston engine which includes
a piston,
a cylinder,
a main combustion chamber which is formed between the piston and the cylinder,
a pre-chamber having a pre-chamber axis,
a riser passage arranged such that the main combustion chamber is in communication by way of the riser passage with the pre-chamber, the riser passage extending inclinedly relative to the pre-chamber axis, and
a gas feed passage separate from the riser passage which opens into the pre-chamber, the gas feed passage being connected to a gas valve, said method comprising:
pushing a gas-air mixture by the piston from the main combustion chamber into the riser passage so as to form a rising, tumble flow in the pre-chamber; and
feeding gas into the pre-chamber by way of the gas feed passage so as to impinge substantially frontally on to the rising flow, wherein said pushing of the gas-air mixture and said feeding of the gas are performed in a same phase.

* * * * *